United States Patent [19]
Jenkins et al.

[11] 3,728,390
[45] Apr. 17, 1973

[54] PREPARATION OF AZINES

[75] Inventors: Trevor Jenkins, Brian John Needham, Michael Arthur Smith, all of Loughborough, England

[73] Assignee: Fisons Limited, London, England

[22] Filed: Oct. 7, 1970

[21] Appl. No.: 78,972

Related U.S. Application Data

[63] Continuation of Ser. No. 543,073, April 18, 1966, abandoned.

[30] Foreign Application Priority Data

Apr. 20, 1965 Great Britain..................16,666/65

[52] U.S. Cl..........................260/566 B, 260/239 AA
[51] Int. Cl.................................C07c 119/00
[58] Field of Search....................260/566 B

[56] References Cited

UNITED STATES PATENTS

| | | | |
|---|---|---|---|
| 2,894,028 | 7/1959 | Rudner | 260/566 X |
| 2,894,031 | 7/1959 | Rudner | 260/566 |
| 2,894,032 | 7/1959 | Rudner | 260/566 |

OTHER PUBLICATIONS

Cynamid's Nitrogen Chemicals Digest Vol. IV "The Chemistry of Guanidine" pp. 3 and 19 (1950)
Kirh-Othmer Encyclopedia of Chemical Technology, Vol. 12, pg. 106 (1954)

Primary Examiner—Leon Zitver
Assistant Examiner—Gerald A. Schwartz
Attorney—Richard P. Crowley

[57] ABSTRACT

Azines and isohydrazones are prepared in high yields by first reacting chlorine and gaseous ammonia to form chloramine and then reacting the thus-formed chloramine with aqueous ammonia and a carbonyl compound.

27 Claims, No Drawings

PREPARATION OF AZINES

This application is a continuation of U.S. Pat. application Ser. No. 543,073, filed Apr. 18, 1966.

The present invention relates to improvements in the manufacture of azines and isohydrazones, which are useful intermediates in the manufacture of hydrazine and its salts.

In the Raschig synthesis of hydrazine, hypochlorite is reacted with ammonia to form chloramine which is reacted with further ammonia to form hydrazine. It has been proposed to increase the yields obtained by this process by performing the process in the presence of a carbonyl compound which gives a hydrazone or azine from which hydrazine can be recovered. The use of hypochlorite, however, has various drawbacks. Thus for example, its use involves handling relatively large volumes of liquid and it tends to convert into chlorite and chlorate which are ineffective.

It has now been found that azines and/or isohydrazones may be made in high yields from ammonia and chlorine, in a two step process, the first step comprising the reaction of gaseous ammonia and chlorine to form chloramine and the second step comprising the reaction of the chloramine with aqueous ammonia and a carbonyl compound, suitably in the presence of a strong base. The reaction of gaseous ammonia and chlorine under these conditions is a high speed reaction.

Where the reaction is carried out in the presence of a sufficient quantity of the strong base, the product is substantially completely the corresponding azine; where the reaction is carried out in the absence of the strong base, the product is largely the corresponding isohydrazone; where the reaction is carried out in the presence of intermediate amounts of strong base, a mixture of the azine and isohydrazone is obtained. It is preferred to operate the process in the presence of a strong base to form the azine, as this is most readily converted to hydrazine. However, the isohydrazone or mixture of azine and isohydrazone may also be converted to hydrazine.

Accordingly the present invention provides a process for preparing azines and/or isohydrazones which comprises as a first step reacting chlorine and gaseous ammonia to form chloramine and thereafter as a second step reacting the chloramine with aqueous ammonia and a carbonyl compound, suitably in the presence of a strong base.

The process of the present invention may be carried out in two stages which are physically separate or alternatively the two steps may be sequential reactions in the same reactor, the process being essentially a single stage process, although involving the two separate steps. Thus for example, in the two stage process, the chlorine and ammonia may be reacted to from chloramine in one vessel and the formed chloramine led into a second vessel containing the carbonyl compound, and, if desired, the strong base. On the other hand, in the single stage process, the chlorine and ammonia may be introduced through means giving good mixing, directly into the reactor containing the aqueous ammonia and carbonyl compound and, if desired, the strong base. In this case the chloramine is formed in situ at the point of contact of the nozzles and thereafter reacts with the carbonyl compound. The chlorine and ammonia are suitably introduced through adjacent nozzles, and very advantageously through concentric twin nozzles, the chlorine and ammonia mixing at the nozzles discharge point in the reactor. Alternatively the gaseous chlorine and ammonia may be mixed in the tube leading into the reactor, such a tube suitably ending in a sintered glass disc to improve mixing characteristics.

Where the chloramine is formed as a separate stage in the two stage process, in order to obtain high yields it is necessary to use an excess of gaseous ammonia in relation to chlorine. The mole ratio of gaseous ammonia to chlorine may be, for example, in the range 10:1 to 50:1 and is preferably in the range 20:1 to 30:1.

On the other hand, where the process is operated as a single stage process, although the same ratios may be used, if desired, the ratio of gaseous ammonia to chlorine may be very much less and very high yields are obtained even where the gaseous ammonia to chlorine ratio is reduced to the stoichiometric ratio of 2:1. It is, in fact, advantageous to use the stoichiometric amount of gaseous ammonia for chloramine formation, as this eliminates the need to recycle gaseous ammonia. This is particularly desirable since the gasious ammonia entrains ammonium chloride, which is very corrosive and which also causes blocking of the chloramine nozzles.

The amount of aqueous ammonia used in the second stage of the process which is required for optimum yields depends to some extent on the excess ammonia associated with the chloramine. The total ammonia (i.e. gaseous plus aqueous) to chlorine mole ratio should be in the range 5:1 to 50:1 and preferably in the range 10:1 to 25:1.

According to a preferred embodiment of the invention, the process is carried out in the presence of a strong base so as to yield the azine without the isohydrazone. Although the isohydrazone, and similarly mixtures of the isohydrazone and azine may be converted to hydrazine and its salts, the isolation and conversion of the azine is much simpler. The amount of strong base used in order to give substantially complete formation of azine is at least 2 mols per mol of chloramine; preferably 2 to 3 mols of strong base are used.

Chloramine is readily decomposed by strong base and in order to obtain maximum yields of azine it has been found essential to control the addition of the strong base very carefully. Preferably the strong base is fed to the reaction along with the chloramine. This can be done by accurately metering-in a solution of known conentration, but a simpler method is to control the pH of the reaction solution. The actual pH values will of course depend on the concentration of reactants and on the temperature, but in the preferred ranges specified it has been found that a pH range of about 12.8 to 13.5 will suppress isohydrazone formation and give high yields of azine.

As the base it is preferred to use an alkali metal hydroxide such as potassium hydroxide or sodium hydroxide. Other bases such as calcium hydroxide, quaternary bases such as anion exchange resins, tetramethylammonium hydroxide and benzyltrimethylammonium hydroxide and the like may be used. In view of cost it will generally be most suitable to use sodium hydroxide.

The carbonyl compound which is used in the present invention may be a ketone or an aldehyde of the formula:

wherein $R^1$ is hydrogen; alkyl, preferably containing one to four carbon atoms such as methyl, ethyl, propyl or butyl; $R^2$ is alkyl, preferably containing one to four carbon atoms such as for example methyl, ethyl, propyl or butyl; or aryl such as for example phenyl or wherein $R^1$ and $R^2$ together with the carbon atom of the carbonyl group form a cycloaliphatic ring. Examples of suitable carbonyl compounds are acetaldehyde, propionaldehyde, methylisobutyl ketone, diethyl ketone, benzaldehyde and cyclohexanone. Preferably the carbonyl compound is acetone or methyl ethyl ketone.

Preferably at least 2 moles, for example 2 – 6 moles, of carbonyl compound are used per mole of hydrazine formed; suitably 2 to 3 moles of carbonyl compound are used.

In the process modification where alkaline conditions exist during the reaction, it is desirable, in some cases, to feed the carbonyl compound to the process at the same time as the chloramine in order to minimise loss of carbonyl compounds by condensation.

Each step of the process of the present invention may be operated at atmospheric pressure or elevated pressures. If super-atmospheric pressures are used the pressure is preferably not more than 20 atmospheres above atmospheric pressure.

The temperature at which each step of the present process is operated is not critical and may befor example any temperature between 0°C or below and the boiling point at the pressure employed of the carbonyl compound. Where operating the process in the absence of sufficient base to yield azine without isohydrazone, it is usually most convenient to operate both stages of the process at a temperature in the range 25° to 45°C. Where operating the process in the presence of sufficient base to yield azine mainly or exclusively, the slower reaction is the formation of azine from hydrazone, and the rate of this reaction increases with increase of temperature, so that the higher temperatures, for example 40°–55°C are preferred.

The reaction may be performed continuously or batchwise.

An agent such as gelatin or ethylenediaminetetraacetic acid may be used in the second step of the process to sequester any ions which interfere with the reaction, although this is not essential. If desired, the chlorine can be diluted with an inert gas such as nitrogen, but this is not essential, as even with undiluted chlorine the reaction is not vigorous.

The azine substantially free from isohydrazone which is formed by the embodiment of the present invention involving the use of strong base may be readily converted into hydrazine hydrate or hydrazine salts by hydrolysis. Thus the azines can be readily converted to hydrazine salts by treatment with an acid such as hydrochloric acid or sulphuric acid or may be converted directly to hydrazine hydrate for example by distillation, suitably under pressure. This embodiment of the invention consequently provides a very effective and economic method of making hydrazine since the other product of the hydrolysis is the carbonyl compound which can be recycled to the process.

The isohydrazone or mixture of azine and isohydrazone obtained by the process of the invention carried out in the absence of sufficient strong base, may also be converted to hydrazine salts, such as hydrazine sulphate, by hydolysis with a strong acid. Hydrazine hydrate can be obtained by treatment of the hydrazine salt. The azine and isohydrazone may also be converted to hydrazine hydrate by treatment with cation exchange resins.

The following examples are given to illustrate the process of the present invention.

EXAMPLE 1

Chlorine (0.2 moles per hour) was continuously mixed with gaseous ammonia (5 moles per hour) in a twin fluid nozzle. After a short residence time, the gases were passed for 1 hour into a stirred reaction mixture at 25°C containing methylethylketone (0.6 moles), saturated ammonium hydroxide (400 ml) and gelatine (1 ml. of 1 percent solution) to which sodium hydroxide (30 percent aqueous solution) was added at 0.4 moles per hour. The yield of methylethylketazine was 95 percent.

The methylethylketazine was distilled from the aqueous reaction solution, dissolved in water and fed to a pressure distillation column and distilled at 180°C under a pressure of 150 pounds per square inch. The methyl ethyl ketone was recovered from the top of the column, and hydrazine hydrate free from ketone recovered from the bottom of the column.

EXAMPLE 2

Chlorine (0.2 moles per hour) was continuously mixed with gaseous ammonia (0.4 moles per hour) in a twin fluid nozzle immersed in the reaction liquor at 35°C. The twin fluid nozzle was arranged with concentrically disposed nozzles, ammonia being delivered through the outer concentric nozzle and chlorine through the inner concentric nozzle. The reaction liquor consisted of acetone (0.6 moles), saturated ammonium hydroxide (500 ml) and gelatine (1 ml. of 1 percent solution) to which sodium hydroxide (30 percent aqueous solution) was added at 0.4 moles per hour. After one hour the yield of acetazine was 96 percent.

Sulphyric acid was added to the reaction product so that the final pH was 1–2; the solution was cooled and the precipitated monohydrazine sulphate filtered off.

EXAMPLE 3

Chlorine (0.2 moles per hour) was continuously mixed with gaseous ammonia (0.4 moles per hour) in a twin fluid nozzle. The twin fluid nozzle was arranged with concentrically disposed nozzles, ammonia being delivered through the outer concentric nozzle and chlorine through the inner concentric nozzle. The twin fluid nozzle was immersed in the reaction liquor containing methylethylketone (0.4 moles), saturated ammonium hydroxide (500 ml), and gelatine (1 ml. of 1 percent solution) at 45°C, to which sodium hydroxide (30 percent aqueous solution) was metered at such a rate as to maintain the pH at 13.0. The rate of sodium hydroxide addition was equivalent to 0.4 moles per hour.

After 1 hour the yield of methylethylketazine was 95 percent.

EXAMPLE 4

Chlorine (0.2 moles per hour) was continuously mixed with gaseous ammonia (0.4 moles per hour) in a twin fluid nozzle immersed in the reaction liquor at 35°C. The reaction liquor consisted of methyl ethyl ketone (0.4 moles), saturated ammonium hydroxide (500 ml.) and gelatine (1 ml. of 1 percent solution) to which sodium hydroxide was added at such a rate as to maintain the pH of the reaction solution at 12.5. The amount of sodium hydroxide added in this way, corresponded to 0.38 moles per hour.

After 1 hour the yield of methyl ethyl ketazine was 89 percent and the yield of the isohydrazone of methyl ethyl ketone was 8 percent.

EXAMPLE 5

Chlorine (0.2 moles per hour) was continuously mixed with gaseous ammonia (0.4 moles per hour) in a twin fluid nozzle immersed in the reaction liquor at 35°C. The reaction liquor consisted of methyl ethyl ketone (0.4 moles), saturated ammonium hydroxide (500 ml), and gelatine (1 ml. of 1 percent solution). After one hour yield of hydrazine was 97 percent as a mixture of 30 percent of azine and 70 percent isohydrazone.

The reaction product was extracted with methyl ethyl ketone in a liquid/liquid extractorl the organic phase was separated, and freed from ammonia by degassing under reduced pressure. The resulting solution was mixed with an equal volume of water and the solution raised to boiling temperature with the sulphonated polystyrene resin cross-linked with divinyl benzene, commercially available as Zeo Karb 225, in amount comprising 40 parts per mol of hyrazine, and then cooled. The resin was filtered off, washed with water and the hydrazine eluted with aqueous ammonia as an aqueous solution of hydrazine hydrate.

We claim:

1. In a process for the preparation of azines, which process comprises reacting chloramine in the presence of a strong base with aqueous ammonia and a carbonyl compound of the formula:

wherein $R_1$ is selected from the group consisting of hydrogen and alkyl groups of one to four carbon atoms; $R_2$ is selected from the group consisting of alkyl groups of one to four carbon atoms and phenyl, and $R_1$ and $R_2$ taken together with the carbonyl group comprise cyclohexanone; the improvement wherein the reaction liquor is maintained at a pH within the range 12.8 to 13.5 by the addition of a strong base selected from the group consisting of an alkali metal hydroxide, calcium hydroxide, tetramethyl ammonium hydroxide and benzyl trimethyl ammonium hydroxide, and wherein at least two moles of the carbonyl compound are used per mole azine formed.

2. A process according to claim 1 wherein the chloramine is formed in a physically separate stage from the reaction by the reaction of gaseous ammonia and gasious chlorine.

3. A process according to claim 1 wherein the chloramine is formed by the reaction of gaseous ammonia and gaseous chlorine in the reactor in which the chloramine, aqueous ammonia and carbonyl compound are reacted.

4. A process according to claim 3 wherein the gaseous ammonia and gaseous chlorine react together at the point of entry to the reactor.

5. A process according to claim 1 wherein the process is carried out in the presence of 2 to 3 moles of the strong base.

6. A process according to claim 1 wherein the process is carried out in the presence of an aqueous solution of sodium or potassium hydroxide calcium hydroxide, quaternary anion exchange resins, tetramethyl ammonium hydroxide and benzyl trimethyl ammonium hydroxide.

7. A process according to claim 1 wherein a strong base is fed to the reactor with the chloramine.

8. A process according to claim 1 wherein 2 to 3 moles of carbonyl compound are used per mole of azine formed.

9. A process according to claim 1 wherein the carbonyl compound is selected from acetone and methyl ethyl ketone.

10. A process for the preparation of an azine which process comprises reacting chlorine and gaseous ammonia in a first step to form chloramine, and thereafter, in a second step, reacting the chloramine with aqueous ammonia and a carbonyl compound of the formula:

wherein $R_1$ is selected from the group consisting of hydrogen and alkyl groups of one to four carbon atoms; $R_2$ is selected from the group consisting of alkyl groups of one to four carbon atoms and phenyl, and $R_1$ and $R_2$ taken together with the carbonyl group comprise cyclohexanone; wherein in the second step of the process the reaction liquor is maintained at a pH within the range 12.8 to 13.5 by the addition of aqueous alkali metal hydroxide, or calcium hydroxide and wherein at least 2 moles of ketone are used per mol of azine formed.

11. A process according to claim 10 wherein the mole ratio of ammonia to chlorine used in the first step is in the range 2:1 to 50:1.

12. A process for the preaparation of azines, which process comprises as a first step: reacting chlorine and gaseous ammonia to form chloramine and thereafter as a second step: reacting the chloramine with aqueous ammonia and a carbonyl compound of the formula:

wherein $R_1$ is selected from the group consisting of hydrogen and one to four carbon alkyl groups; $R_2$ is selected from the group consisting of one to four carbon alkyl groups and phenyl and $R_1$ and $R_2$, taken together, comprise cyclohexanone; wherein the pH of the reaction liquor in the second step of the process is maintained within the range of 12.8 to 13.5 by the addition of an aqueous alkali metal hydroxide solution; and wherein at least two moles of the carbonyl compound are used per mole of azine formed.

13. A process as claimed in claim 12 wherein the two steps are carried out as physically separate stages.

14. A process as claimed in claim 12 wherein the mole ratio of gaseous ammonia to chlorine in the first step is in the range 10:1 to 50:1.

15. A process as claimed in claim 12 wherein the two steps are carried out in the same reactor and the chlorine and gaseous ammonia react together to form chloramine at the point of entry to the reactor where the second step is carried out.

16. A process as claimed in claim 15 wherein the chlorine and gaseous ammonia are introduced through concentric twin nozzles.

17. A process as claimed in claim 12 wherein the mole ratio of ammonia to chlorine in the first step is in the range 2:1 to 50:1.

18. A process as claimed in claim 15 wherein the mole ratio of ammonia to chlorine in the first step is 2:1.

19. A process as claimed in claim 13 wherein in the reaction the mole ratio of the ammonia used in the first step together with the ammonia used in the second step to chlorine is in the range 5:1 to 50:1.

20. A process as claimed in claim 12 wherein the second step of the process is carried out at a temperature of 25°-45°C.

21. A process as claimed in claim 12 wherein the second step of the process is carried out in the presence of 2 to 3 mols of strong base.

22. A process as claimed in claim 12 wherein the strong base is fed to the second step of the process together with the chloramine.

23. A process as claimed in claim 12 wherein the carbonyl compound is selected from the group consisting of acetone and methyl ethyl ketone.

24. A process as claimed in claim 12 wherein 2 to 3 moles of carbonyl compound are used per mole of azine formed.

25. A process for the preparation of a methyl ethyl ketone azine which process comprises as a first step: reacting chlorine and gaseous ammonia to form chloramine, the mole ratio of gaseous ammonia to chlorine being in the range 10:1 to 50:1; and thereafter, as a second step: reacting the chloramine with aqueous ammonia and methyl ethyl ketone wherein the pH of the reaction liquor in the second step of the process is maintained within the range of 12.8 to 13.5 by the addition of an aqueous solution of alkali metal hydroxide; wherein from 2 to 3 moles of carbonyl compound are used per mole of azine formed; and wherein the two steps are carried out in the same reactor and the chlorine and the gaseous ammonia reacted together to form chloramine at the point of entry to the reactor where the second step is carried out.

26. A process as defined in claim 25 wherein the chloramine and gaseous ammonia are introduced through concentric twin nozzles.

27. A process as claimed in claim 25 wherein the alkali metal hydroxide is selected from the group consisting of sodium and potassium hydroxide.

* * * * *